(12) United States Patent
Tsuchihashi et al.

(10) Patent No.: US 11,487,329 B2
(45) Date of Patent: Nov. 1, 2022

(54) PORTABLE INFORMATION DEVICE HAVING A FLEXIBLE DISPLAY

(71) Applicant: LENOVO (SINGAPORE) PTE. LTD., Singapore (SG)

(72) Inventors: Moriyuki Tsuchihashi, Kanagawa (JP); Takayuki Morino, Kanagawa (JP); Kenji Watamura, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 17/180,088

(22) Filed: Feb. 19, 2021

(65) Prior Publication Data
US 2021/0263563 A1    Aug. 26, 2021

(30) Foreign Application Priority Data

Feb. 21, 2020   (JP) .............................. JP2020-028186

(51) Int. Cl.
*G06F 1/16*    (2006.01)

(52) U.S. Cl.
CPC .......... *G06F 1/1652* (2013.01); *G06F 1/1616* (2013.01)

(58) Field of Classification Search
CPC ..... G06F 1/1652; G06F 1/1616; G06F 1/1681
See application file for complete search history.

(56) References Cited

U.S. PATENT DOCUMENTS

| | | | | |
|---|---|---|---|---|
| 10,342,121 B2 * | 7/2019 | Koo | ........................ | G09F 9/301 |
| 10,866,618 B2 * | 12/2020 | Yeom | .................. | H04M 1/0268 |
| 10,915,140 B2 * | 2/2021 | Kim | ....................... | G06F 1/1681 |
| 11,076,499 B2 * | 7/2021 | Jeon | ...................... | H05K 5/0226 |
| 11,227,515 B2 * | 1/2022 | Kim | ....................... | G06F 1/1616 |
| 11,246,228 B2 * | 2/2022 | Kim | ....................... | G06F 1/1681 |
| 2016/0302314 A1 * | 10/2016 | Bae | ........................ | G06F 1/1616 |
| 2018/0074551 A1 | 3/2018 | Hong et al. | | |
| 2019/0098774 A1 | 3/2019 | Park et al. | | |
| 2019/0207141 A1 | 7/2019 | Kim et al. | | |
| 2020/0344897 A1 * | 10/2020 | Kim | ....................... | H05K 5/0004 |
| 2020/0389986 A1 * | 12/2020 | Tsuchihashi | .......... | G06F 1/1616 |
| 2021/0007229 A1 * | 1/2021 | Gu | ........................... | G09F 9/301 |
| 2021/0066626 A1 * | 3/2021 | Park | ....................... | G06F 1/1652 |

FOREIGN PATENT DOCUMENTS

| | | |
|---|---|---|
| JP | 2018-112833 A | 7/2018 |
| JP | 2019-519617 | 7/2019 |
| WO | 2015178391 | 11/2015 |
| WO | 2018213687 | 11/2018 |

\* cited by examiner

*Primary Examiner* — Rockshana D Chowdhury
(74) *Attorney, Agent, or Firm* — Antony P. Ng; Russell Ng PLLC

(57) ABSTRACT

A portable information device is described. The portable information device includes a first chassis, a second chassis, a display, and a flexible sheet-shaped member. The display includes a folding region located between the first and second chassis. The sheet-shaped member is attached to a first fixed point located at a position offset from a center of the folding region to a side of the first chassis, and is also attached to a second fixed point located at a position offset from the center of the folding region to a side of the second chassis. In addition, the sheet-shaped member includes a first strength changing section in which a flexural strength decreases gradually from the first fixed point towards a first inflection point, and a second strength changing section in which the flexural strength decreases gradually from the second fixed point towards a second inflection point.

13 Claims, 9 Drawing Sheets

PORTABLE INFORMATION DEVICE HAVING A FLEXIBLE DISPLAY

PRIORITY CLAIM

The present application claims benefit of priority under 35 U.S.C. §§ 120, 365 to the previously filed Japanese Patent Application No. JP2020-28186 with a priority date of Feb. 21, 2020, which is incorporated by reference herein.

TECHNICAL FIELD

The present invention relates to portable information devices in general, and in particular to a portable information device having a flexible display.

BACKGROUND

In recent years, portable information devices, such as tablet personal computers (PCs) or smart phones, having a touch panel type liquid crystal display (LCD) but without a physical keyboard have been becoming more popular. The display of this type of portable information device is desired to be large when being in use but small when not being in use. Therefore, a portable information device uses a flexible display, such as organic electro luminescence (EL), in order to allow the display to be foldable with the chassis.

Since the display to be folded needs to be able to withstand repeated folding operations, the display needs to be folded with a desired radius of curvature. In the meantime, the display may have an installation structure in which a bending direction is reversed within a folding region, depending on the installation state inside the chassis or for further thinning the chassis. However, there is a concern that the curvature radius of the display of this installation structure may become smaller than expected in the neighborhood of a fixed point with respect to the chassis to contribute to a failure.

Consequently, it would be desirable to provide a portable information device having a flexiable display that is free from a display failure due to folding operations.

SUMMARY

In accordance with an embodiment of the present disclosure, a portable information device includes a first chassis, a second chassis rotatably coupled to the first chassis, a display covering the first and second chassis, and a flexible sheet-shaped member covering a back surface of the display. The display includes a folding region located between the first and second chassis. The sheet-shaped member is attached to a first fixed point located at a position offset from a center of the folding region to a side of the first chassis, and is attached to a second fixed point located at a position offset from the center of the folding region to a side of the second chassis. In addition, the sheet-shaped member includes a first strength changing section in which a flexural strength decreases gradually from the first fixed point towards a first inflection point, and a second strength changing section in which the flexural strength decreases gradually from the second fixed point towards a second inflection point.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
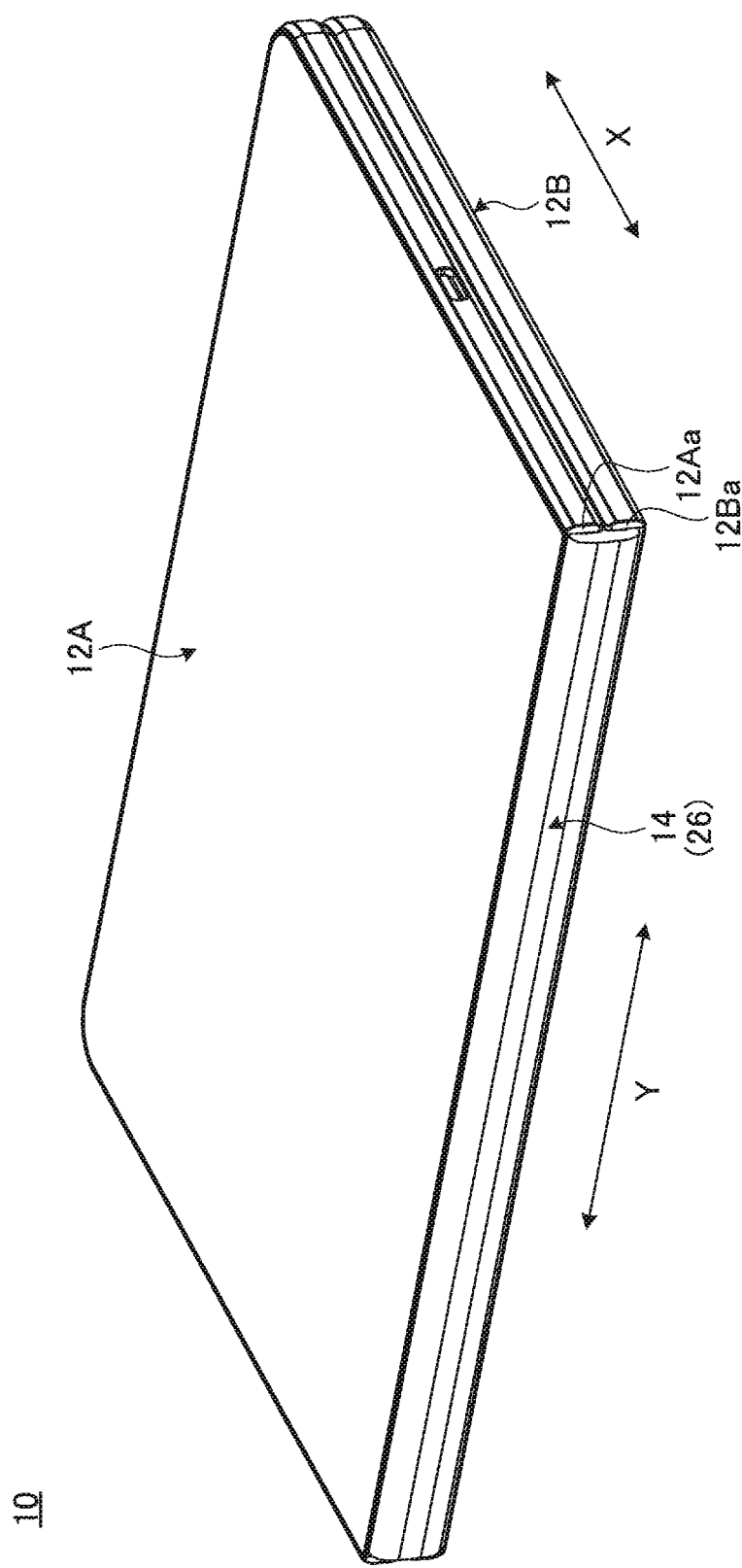
FIG. 1 is a perspective view of a portable information device when it is closed.
Figure 2:
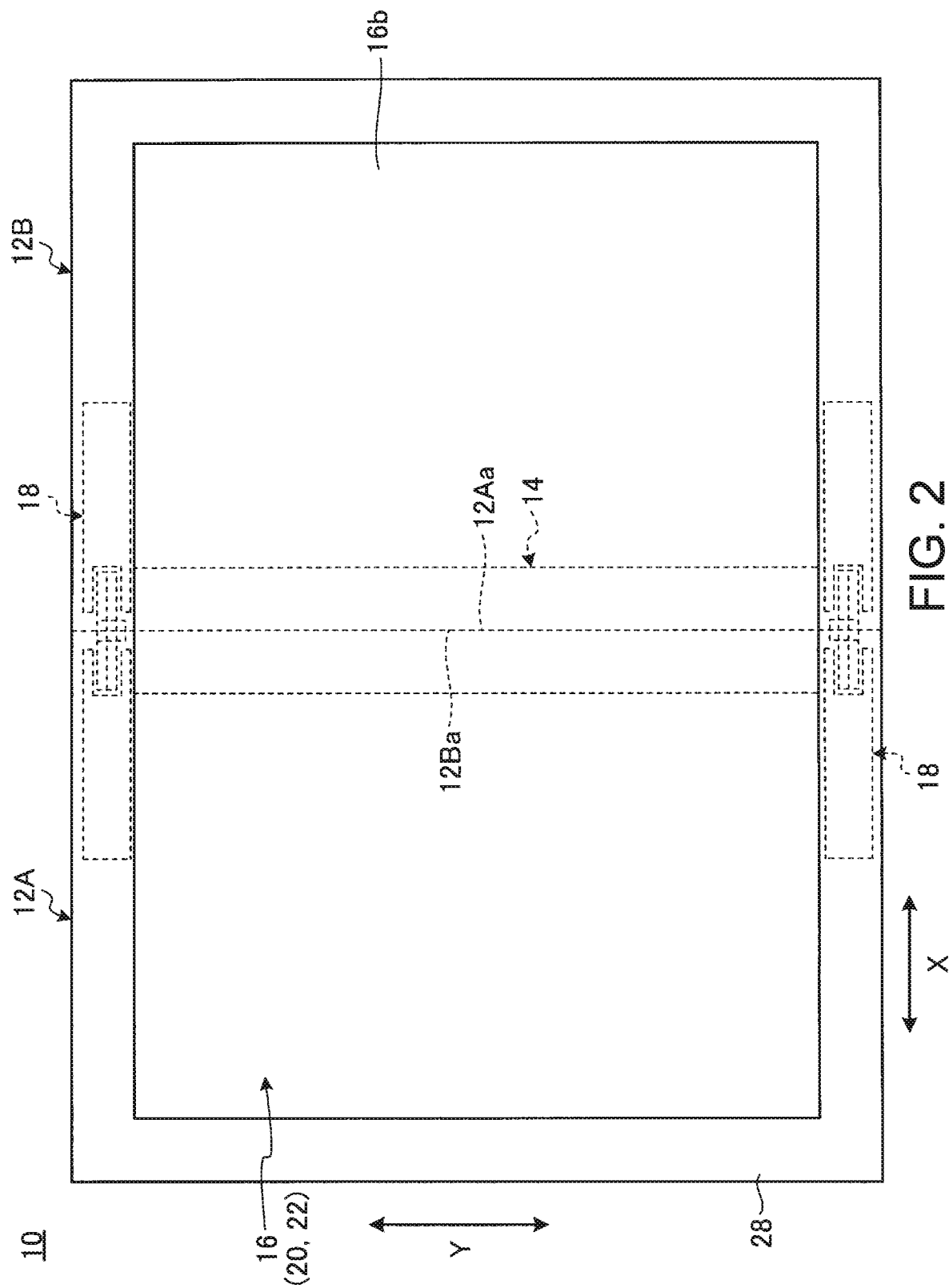
FIG. 2 is a plan view of the portable information device from FIG. 1 when it is opened.

Referring now to the drawings and in particular to FIG. 1, there is illustrated a perspective view of a portable information device 10 being in a closed state, and shaped into a folded form. FIG. 2 is a plan view illustrating a state where the portable information device 10 is an opened state, and shaped into a flat plate form. As illustrated in FIG. 1 and FIG. 2, the portable information device 10 includes a first chassis 12A and a second chassis 12B, a spine member 14, and a display assembly 16. In the embodiment, a tablet PC foldable like a book is exemplified as the portable information device 10. The portable information device 10 may also be a mobile phone, a smart phone, a portable game machine, or the like.

The chassis 12A and 12B are placed adjacent to each other. Each of the chassis 12A and 12B is formed into a rectangular, plate-shaped member with side walls standing on three sides except a side (adjacent edge 12Aa, 12Ba) corresponding to the spine member 14, respectively. The chassis 12A, 12B is formed from a metal plate made of stainless steel, magnesium, aluminum, or the like, or formed from a fiber-reinforced plastic plate containing reinforcing fiber such as carbon fiber. The spine member 14 is a member that hides a gap between adjacent edges 12Aa and 12Ba formed in the folded form illustrated in FIG. 1. The display assembly 16 extends over the chassis 12A and 12B.

The portable information device 10 as illustrated in FIG. 1 and FIG. 2 will be described below by expressing a line-up direction of the chassis 12A, 12B as an X direction and a direction orthogonal to the line-up direction along the adjacent edges 12Aa, 12Ba as a Y direction.

Figure 3A:
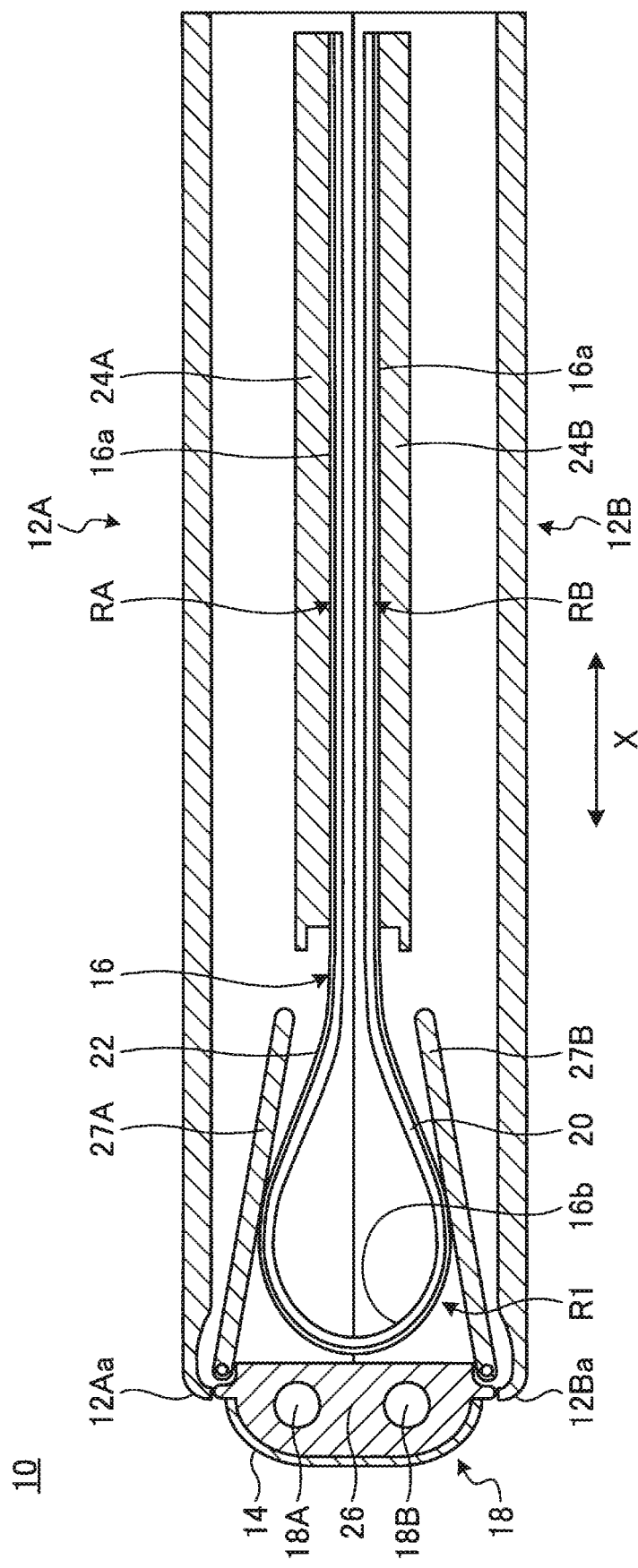
FIG. 3A is a side sectional view illustrating the internal structure of the portable information device from FIG. 1 in the folded form.
Figure 3B:
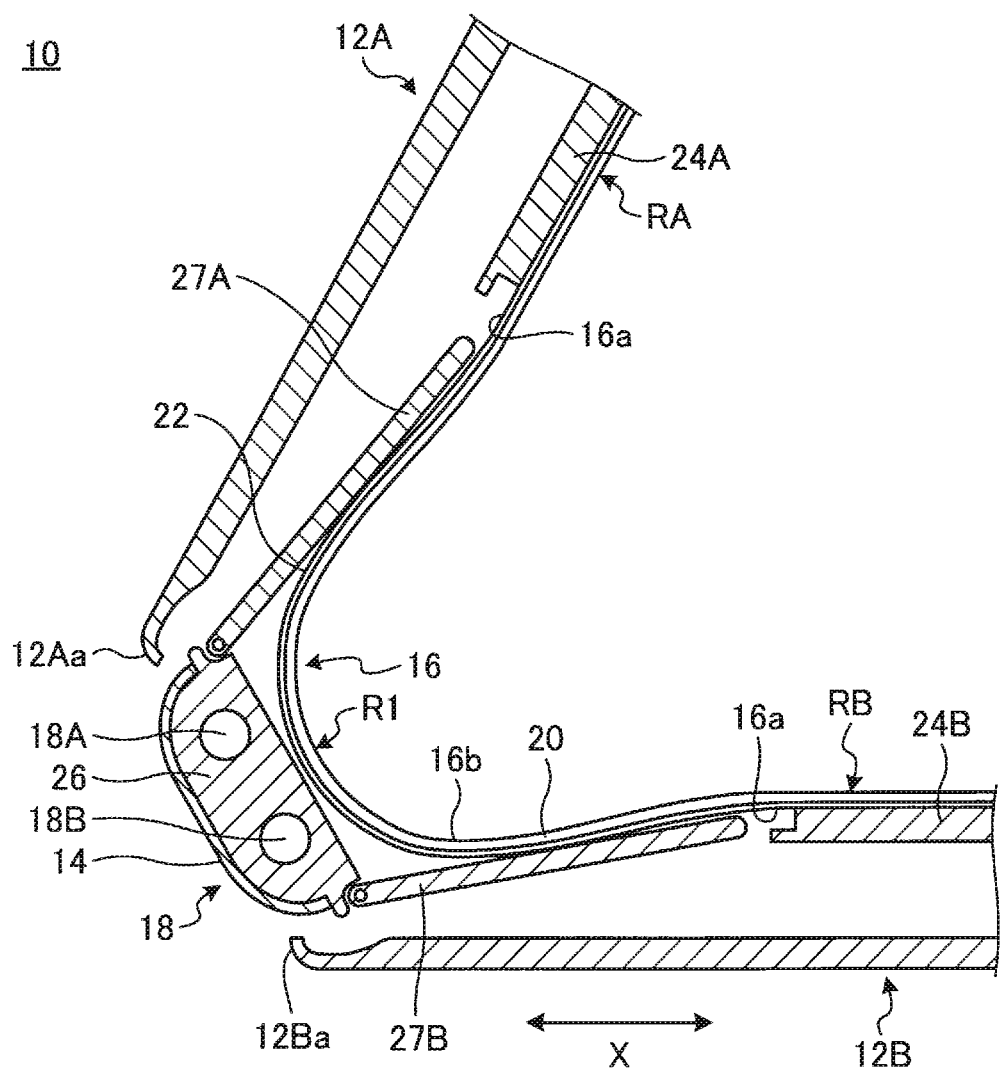
FIG. 3B is a side sectional view illustrating a state during rotating chassis from the state illustrated in FIG. 3A towards the flat plate form.
Figure 3C:
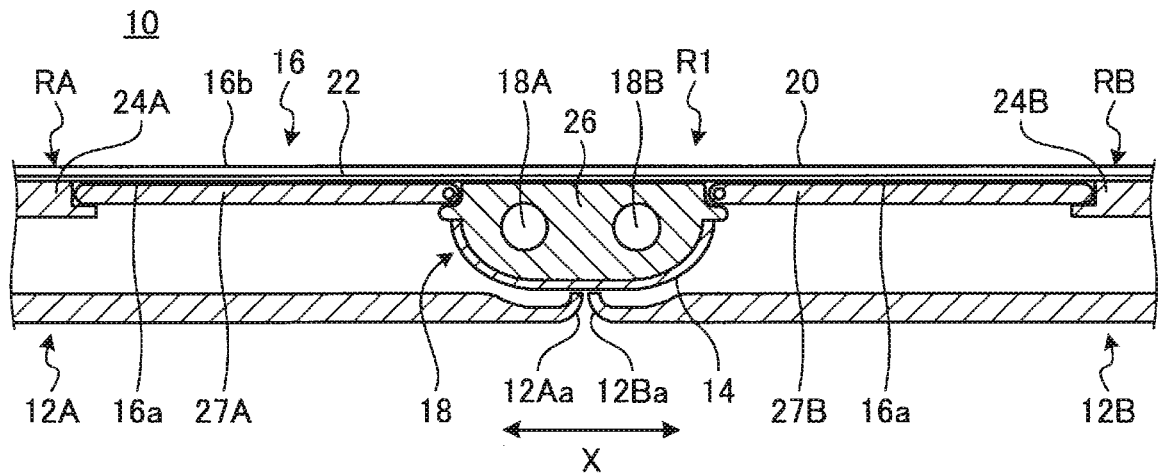
FIG. 3C is a side sectional view illustrating a state where the portable information device from FIG. 3A is shaped into the flat plate form.

FIG. 3A is a side sectional view illustrating the internal structure of the portable information device 10 in the folded form. FIG. 3B is a side sectional view illustrating a state in the process of rotating the chassis 12A, 12B from the state illustrated in FIG. 3A toward the flat plate form. FIG. 3C is a side sectional view in a state where the portable information device 10 illustrated in FIG. 3A is shaped into the flat plate form.

As illustrated in FIG. 1 to FIG. 3C, the adjacent edges 12Aa and 12Ba of the chassis 12A and 12B are coupled to each other by a pair of hinge mechanisms 18 provided on both edges in the Y direction. As illustrated in FIG. 3A to FIG. 3C, the hinge mechanisms 18 couple between the chassis 12A and 12B to be rotatable relative to each other between the folded form illustrated in FIG. 1 and the flat plate form illustrated in FIG. 2.

In the folded form, the chassis 12A and 12B are disposed to overlap each other. On this occasion, the display assembly 16 is so disposed that a region RA on the side of the first chassis 12A and a region RB on the side of the second chassis 12B face each other, and a folding region R1 as an intermediate region between the regions RA and RB is in a folded state (see FIG. 3A). In other words, the folding region R1 is provided in a position between right and left edges of the rectangular sheet-shaped display assembly 16. In the flat plate form, the chassis 12A and 12B are lined up with each other in an in-plane direction. On this occasion, the regions RA, RB and the folding region R1 of the display assembly 16 are lined up in the in-plane direction and shaped into one flat plate as a whole (see FIG. 2 and FIG. 3C).

As illustrated in FIG. 3A to FIG. 3C, the display assembly 16 has such a structure that a display 20 and a sheet-shaped member 22 are laminated.

The display assembly 16 is such that the region RA is fixed relative to the first chassis 12A, and the region RB is fixed relative to the second chassis 12B. In the embodiment, a back surface 16a of the region RA is supported by a first plate 24A, and fixed to the first chassis 12A through the first plate 24A. The back surface 16a of the region RB is supported by a second plate 24B, and fixed to second chassis 12B through the second plate 24B. Each of the plates 24A and 24B is fixed to the chassis 12A, 12B with screws or the like. The folding region R1 is in a state of being movable relative to the chassis 12A, 12B.

As illustrated in FIG. 3A to FIG. 3C, each of the hinge mechanisms 18 of the embodiment has a hinge body 26, a first auxiliary plate 27A, and a second auxiliary plate 27B.

The hinge body 26 is a rod-shaped member provided in a position across the adjacent edges 12Aa and 12Ba of the chassis 12A and 12B (see FIG. 3C) to extend in the Y direction. The spine member 14 is placed to cover the outer surface of the hinge body 26. The hinge body 26 may also function directly as the spine member 14. In the hinge body 26, two hinge shafts 18A and 18B lined up in the X direction in the flat plate form are supported. The hinge shaft 18A is coupled to the first chassis 12A through an unillustrated link member or the like. The hinge shaft 18B is coupled to the second chassis 12B through an unillustrated link member or the like. An edge of the first auxiliary plate 27A on the side of the adjacent edge 12Aa is coupled to the hinge body 26 to be rotatable around the axis of rotation. An edge of the second auxiliary plate 27B on the side of the adjacent edge 12Ba is coupled to the hinge body 26 to be rotatable around the axis of rotation.

According to the above-mentioned structure, the hinge mechanism 18 couples the chassis 12A and 12B to be rotatable between the folded form illustrated in FIG. 3A and the flat plate form illustrated in FIG. 3C. The center of rotation of the hinge mechanism 18 matches a surface 16b of the display assembly 16. The structure of the hinge mechanism 18 may be changed as appropriate.

Thus, in the folded form illustrated in FIG. 3A, the regions RA and RB of the display assembly 16 are supported by the plates 24A and 24B, respectively. On this occasion, the folding region R1 becomes a substantially bell shape (substantially light bulb shape) in side view in a state of being encapsulated by the hinge body 26 and the auxiliary plates 27A and 27B. On the other hand, in the flat plate form illustrated in FIG. 3C, the plates 24A, 24B, the hinge body 26, and the auxiliary plates 27A, 27B are lined up in the in-plane direction with respective surfaces flush with one another to form a flat plate as a whole. Therefore, the back surface 16a of the display assembly 16 is supported on this flat plate to form one flat plate-shaped large screen. Note that reference numeral 28 in FIG. 2 is a bezel member as a cover member to cover, in a frame shape, an inactive region located on the periphery of the surface 16b of the display assembly 16.

Figure 4:
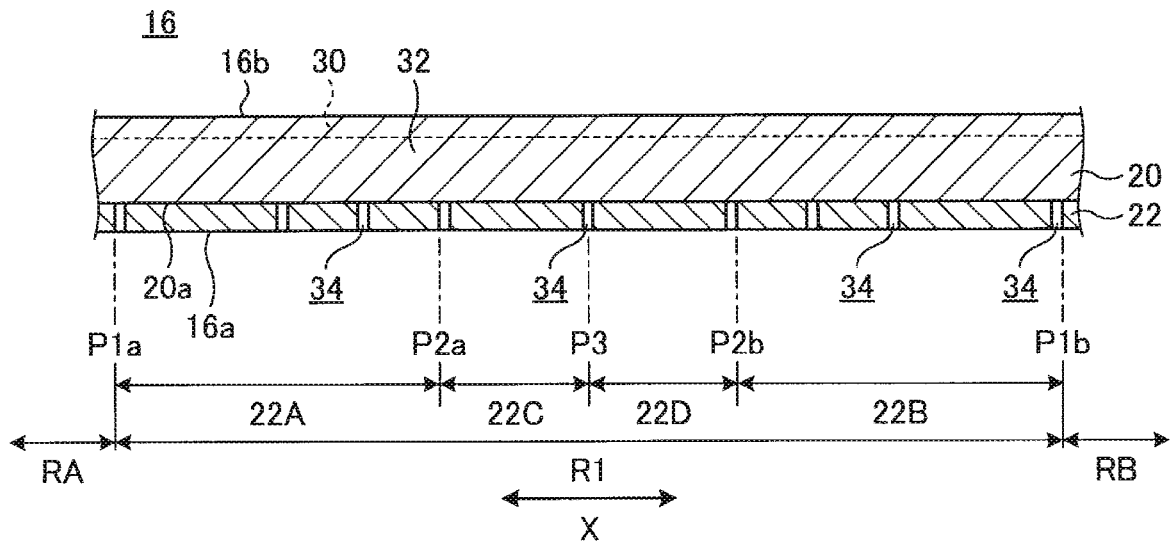
FIG. 4 is a side sectional view of a display assembly.

Next, a specific structure example of the display assembly 16 will be described. FIG. 4 is a side sectional view of the display assembly 16.

As illustrated in FIG. 4, the display assembly 16 has such a structure that the sheet-shaped member 22 is laminated on a back surface 20a of the display 20 located on the side of the surface 16b.

For example, the display 20 has a structure in which a transparent surface protective film that forms the surface 16b, a touch panel 30, a liquid crystal member 32, and a back film that forms the back surface 20a are laminated. The touch panel 30 is, for example, of a capacitance type that supports touch operation with a pen input device such as a digitizer pen and touch operation with a human fingertip. The liquid crystal member 32 is, for example, organic EL. The display 20 has a highly flexible paper structure as a whole.

The sheet-shaped member 22 is a thin sheet having flexibility and fixed to the back surface 20a with double-sided adhesive tape or adhesive to cover the back surface 20a of the display 20. In other words, the whole display assembly 16 has a flexible structure. Note that as long as a section corresponding to at least the folding region R1 is flexible, the other sections (regions RA and RB) of the display assembly 16 may also be hard.

Figure 6:
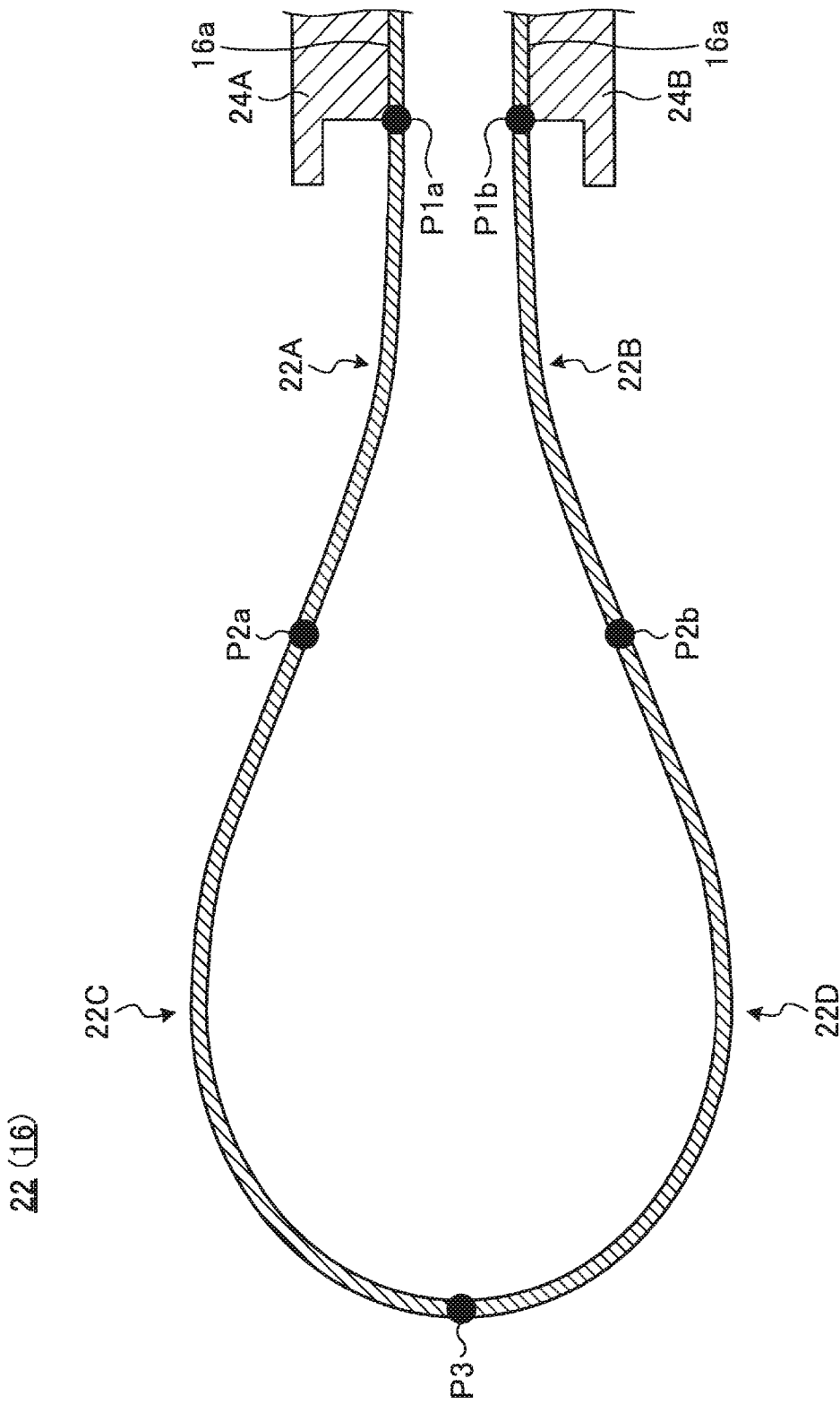
FIG. 6 is a side sectional view illustrating a state of a sheet-shaped member in the folded form.
Figure 7:
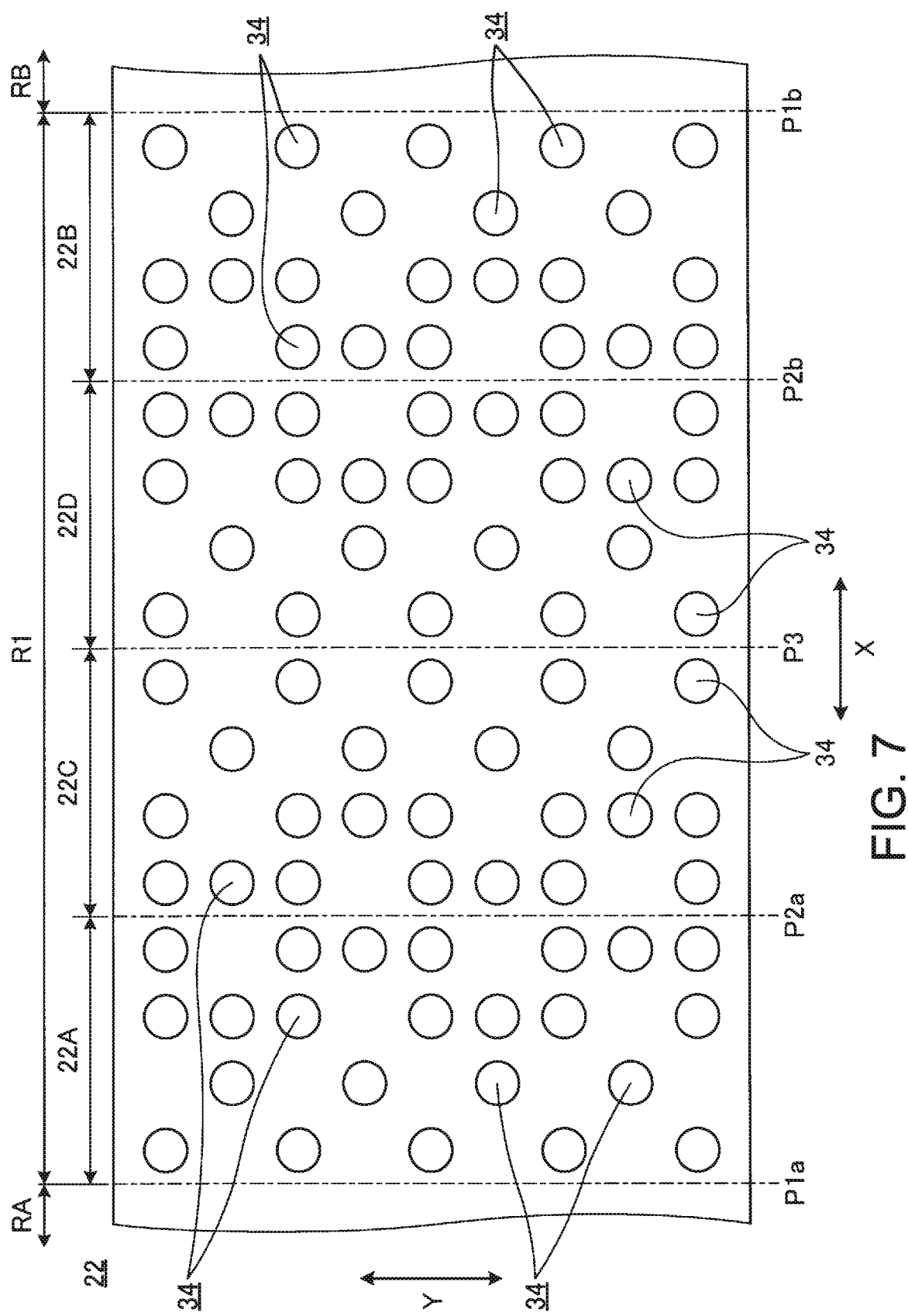
FIG. 7 is a plan view illustrating a state of the sheet-shaped member in the flat plate form.

FIG. 6 is a side sectional view illustrating a state of the sheet-shaped member 22 in the folded form. In FIG. 6, the display 20, the hinge mechanism 18, the chassis 12A, 12B, and the like are omitted from the illustration. FIG. 7 is a plan view illustrating a state of the sheet-shaped member 22 in the flat plate form.

As illustrated in FIG. 4, FIG. 6, and FIG. 7, the sheet-shaped member 22 is formed from a punching metal sheet with many holes 34 formed therethrough, a mesh sheet, or the like. In FIG. 6, the holes 34 are omitted from the illustration. The sheet-shaped member 22 is fixed to the first plate 24A at least at a first fixed point P1a, and fixed to the second plate 24B at least at a second fixed point P1b. The cross-sectional shape of each of the holes 34 may also be a rectangular or polygonal shape, or an elliptical slit shape, as well as a round shape. It is preferred that the inner diameter (minor diameter) of the hole 34 be smaller than at least the outer diameter (for example, about 1 mm) of a pen tip of the pen input device (not illustrated) used for the portable information device 10.

The first fixed point P1a is located at a position offset from a center P3 of the folding region R1 in the X direction to the side of the first chassis 12A. The first fixed point P1a is located on an edge of the first plate 24A on the side of the hinge mechanism 18 to extend in the Y direction. The first fixed point P1*a* is a point at a position closest to the hinge mechanism 18 among support points by the first plate 24A in the region RA of the sheet-shaped member 22. The whole surface of the region RA of the sheet-shaped member 22 does not have to be fixed as long as it is fixed to the first plate 24A at least at the first fixed point P1*a*.

The second fixed point P1*b* is located at a position offset from the center P3 of the folding region R1 to the side of the second chassis 12B. The second fixed point P1*b* is located on an edge of the second plate 24B on the side of the hinge mechanism 18 to extend in the Y direction. The second fixed point P1*b* is a point at a position closest to the hinge mechanism 18 among support points by the second plate 24B in the region RB of the sheet-shaped member 22. The whole surface of the region RB of the sheet-shaped member 22 does not have to be fixed as long as it is fixed to the second plate 24B at least at the second fixed point P1*b*.

As described above, in the display assembly 16, a section corresponding to the folding region R1 is in a state of being movable relative to the chassis 12A, 12B. In other words, in the sheet-shaped member 22 that forms the back surface 16*a* of the display assembly 16, a section corresponding to the folding region R1 is in a state of being movable relative to the chassis 12A, 12B. Thus, the folding region R1 is virtually in a free state except in the flat plate form in which the section is supported on the plane. As a result, in the folded form illustrated in FIG. 3A, the display assembly 16 (sheet-shaped member 22) is such that the folding region R1 from the first fixed point P1*a* to the second fixed point P1*b* through the center P3 forms the substantially bell shape illustrated in FIG. 6. Therefore, in the folded form illustrated in FIG. 6, a first inflection point (first position) P2*a* and a second inflection point (second position) P2*b* are formed in the sheet-shaped member 22 (display assembly 16).

The first inflection point P2*a* is a point at which the bending direction of the sheet-shaped member 22 from the first fixed point P1*a* toward the center P3 of the folding region R1 is reversed from outward bending to inward bending. Here, the outward bending is a bent part in which the center of the curvature radius is located on the outside of the folding region R1 (on the side of the back surface 16*a*) that forms the substantially bell shape illustrated in FIG. 6. The inward bending is a bent part in which the center of the curvature radius is located on the inside of the folding region R1 (on the side of the surface 16*b*) that forms the substantially bell shape illustrated in FIG. 6.

Thus, when the curvature radius of the outward bending circle of the sheet-shaped member 22 becomes too small particularly at the first fixed point P1*a* or in the neighborhood thereof, a shear stress is concentrated on this part to cause a concern that the sheet-shaped member 22 might peel off from the display 20. Note that there is also a concern that the sheet-shaped member 22 might peel off from the display 20 on the side of the second fixed point P1*b* for the same reason.

Therefore, as illustrated in FIG. 4 and FIG. 6, the sheet-shaped member 22 of the embodiment is provided with a first strength changing section 22A between the first fixed point P1*a* and the first inflection point P2*a*, and a second strength changing section 22B between the second fixed point P1*b* and the second inflection point P2*b*.

The first strength changing section 22A is a region in which the flexural strength of the sheet-shaped member 22 gradually decreases from the first fixed point P1*a* toward the first inflection point P2*a*. The second strength changing section 22B is a region in which the flexural strength of the sheet-shaped member 22 gradually decreases from the second fixed point P1*b* toward the second inflection point P2*b*. In other words, in the first strength changing section 22A, the flexural strength of the sheet-shaped member 22 gradually increases from the first inflection point P2*a* toward the first fixed point P1*a*. Similarly, in the second strength changing section 22B, the flexural strength of the sheet-shaped member 22 gradually increases from the second inflection point P2*b* toward the second fixed point P1*b*.

Here, the flexural strength means the degree of difficulty to bend upon bending the sheet-shaped member 22 by applying an external force in an out-of-plane direction. For example, in the first strength changing section 22A, the flexural strength in a position closer to the first fixed point P1*a* is larger than the flexural strength in a position closer to the first inflection point P2*a*. Thus, the curvature radius of the bent part formed in a root portion of the folding region R1 of the sheet-shaped member 22 can be increased to make the curve gentle. Note that the second strength changing section 22B also fulfill the same function as that of the first strength changing section 22A.

In other words, suppose that the sheet-shaped member 22 has a uniform flexural strength in the whole range. In this case, a stress larger than that applied to the other parts is applied to the root of the substantially bell shape supported at the fixed points P1*a* and P1*b*. As a result, a curve formed in this root portion becomes steep to cause a concern that such a failure as to make the sheet-shaped member 22 peel off from the display 20 might occur. In this regard, since the above-mentioned strength changing sections 22A and 22B are provided in the sheet-shaped member 22 of the display assembly 16, the occurrence of such a failure can be prevented.

Note that each of the strength changing sections 22A and 22B may have any structure other than the structure in which the flexural strength gradually changes over the entire length from the fixed point P1*a*, P1*b* to the inflection point P2*a*, P2*b*, such as a structure in which the flexural strength changes from the fixed point P1*a*, P1*b* up to a position before the inflection point P2*a*, P2*b*, and then the flexural strength is uniform up to the inflection point P2*a*, P2*b*.

As illustrated in FIG. 4 and FIG. 7, the sheet-shaped member 22 of the embodiment changes the aperture ratio of the holes 34 in the X direction to form the strength changing sections 22A and 22B. Specifically, if the inner diameter (aperture area) of all of the holes 34 is the same as illustrated in FIG. 7, the number of holes 34 formed per unit area will be gradually increased from the first fixed point P1*a* toward the first inflection point P2*a* in the first strength changing section 22A to increase the aperture ratio. Thus, the sheet-shaped member 22 becomes flexible gradually from the first fixed point P1*a* toward the first inflection point P2*a* to decrease the flexural strength. The second strength changing section 22B is also formed in the same manner.

The strength changing section 22A, 22B may also be so formed that the inner diameter of each of the holes 34 is increased from the first fixed point P1*a* toward the first inflection point P2*a* without changing the number of holes 34 formed per unit area. Alternatively, the strength changing section 22A, 22B may be so formed that the inner diameter of each of the holes 34 is gradually increased from the first fixed point P1*a* toward the first inflection point P2*a* while increasing the number of holes 34 per unit area.

As illustrated in FIG. 4 and FIG. 7, the sheet-shaped member 22 of the embodiment also includes a third strength changing section 22C and a fourth strength changing section 22D to change the flexural strength near the center P3 of the folding region R1. The third strength changing section 22C is a region in which the flexural strength of the sheet-shaped member 22 gradually increases from the first inflection point P2a toward the center P3. The fourth strength changing section 22D is a region in which the flexural strength of the sheet-shaped member 22 gradually increases from the second inflection point P2b toward the center P3. In other words, each of the strength changing section 22C, 22D is a region in which the flexural strength of the sheet-shaped member 22 gradually decreases from the center P3 toward the inflection point P2a, P2b, respectively. These strength changing sections 22C and 22D may change the flexural strength by the same method as that in the structure of the strength changing sections 22A and 22B mentioned above. The strength changing sections 22C and 22D may also be omitted so that the sheet-shaped member 22 has a uniform flexural strength in a section from the first inflection point P2a up to the second inflection point P2b through the center P3. Note, however, that increasing the flexural strength is more preferable than having a uniform flexural strength from the inflection point P2a, P2b toward the center P3. The reason is that when the flexural strength in this section is uniform, the section has a pointed shape from there (center P3) and the bending stress is concentrated on the apex (center P3). Since the section from the inflection point P2a, P2b to the center P3 draws a curve approximate to a uniform curve by increasing the flexural strength from the inflection point P2a, P2b toward the center P3, the bending stress at the apex can be reduced.

The strength changing sections 22C and 22D may also have any structure other than the structure in which the flexural strength changes gradually in the full length from the center P3 to the inflection point P2a, P2b, such as a structure in which the flexural strength changes from the center P3 up to a position before the inflection point P2a, P2b, and then the flexural strength is uniform up to the inflection point P2a, P2b.

Figure 5:
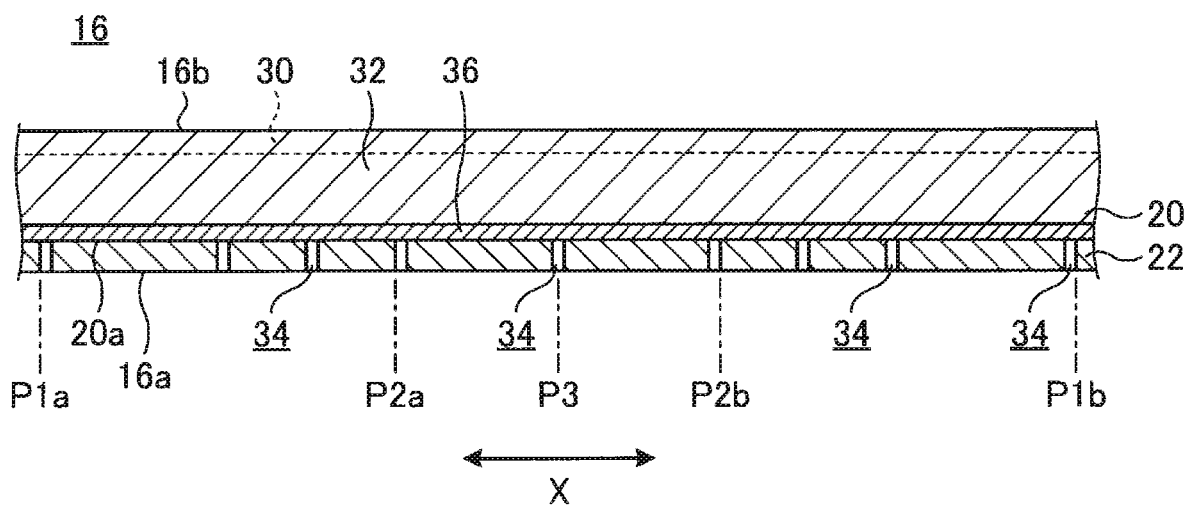
FIG. 5 is a side sectional view of a structure example of a display assembly provided with a conductive sheet.

As illustrated in FIG. 5, the display assembly 16 may also have such a structure that a conductive sheet 36 intervenes between the back surface 20a of the display 20 and the surface of the sheet-shaped member 22. The conductive sheet 36 is fixed with double-sided adhesive tape or adhesive between the display 20 and the sheet-shaped member 22. The conductive sheet 36 is a noise shield sheet for a digitizer pen used for the touch panel 30, which can block a radiated magnetic field of 1.8 MHz, for example. In other words, since the holes 34 are formed in the sheet-shaped member 22, the shielding effect of the sheet-shaped member 22 is low. Therefore, the conductive sheet 36 is formed from a stainless sheet, an aluminum sheet, or the like without holes.

The portable information device 10 can use the conductive sheet 36 to prevent electromagnetic noise from a semiconductor chip, a battery device, and the like housed under the sheet-shaped member 22 from affecting the touch panel 30. As a result, touch operation on the touch panel 30 with the digitizer pen or a fingertip is not disturbed by the electromagnetic noise, and smooth touch operation is possible. The conductive sheet 36 may be placed to cover at least an area to overlap a touch operation effective area of the touch panel 30. The conductive sheet 36 may also be placed on the back surface 16a of the sheet-shaped member 22. The conductive sheet 36 may also be used in combination with a sheet-shaped member 40, 50 to be described below.

Figure 8:
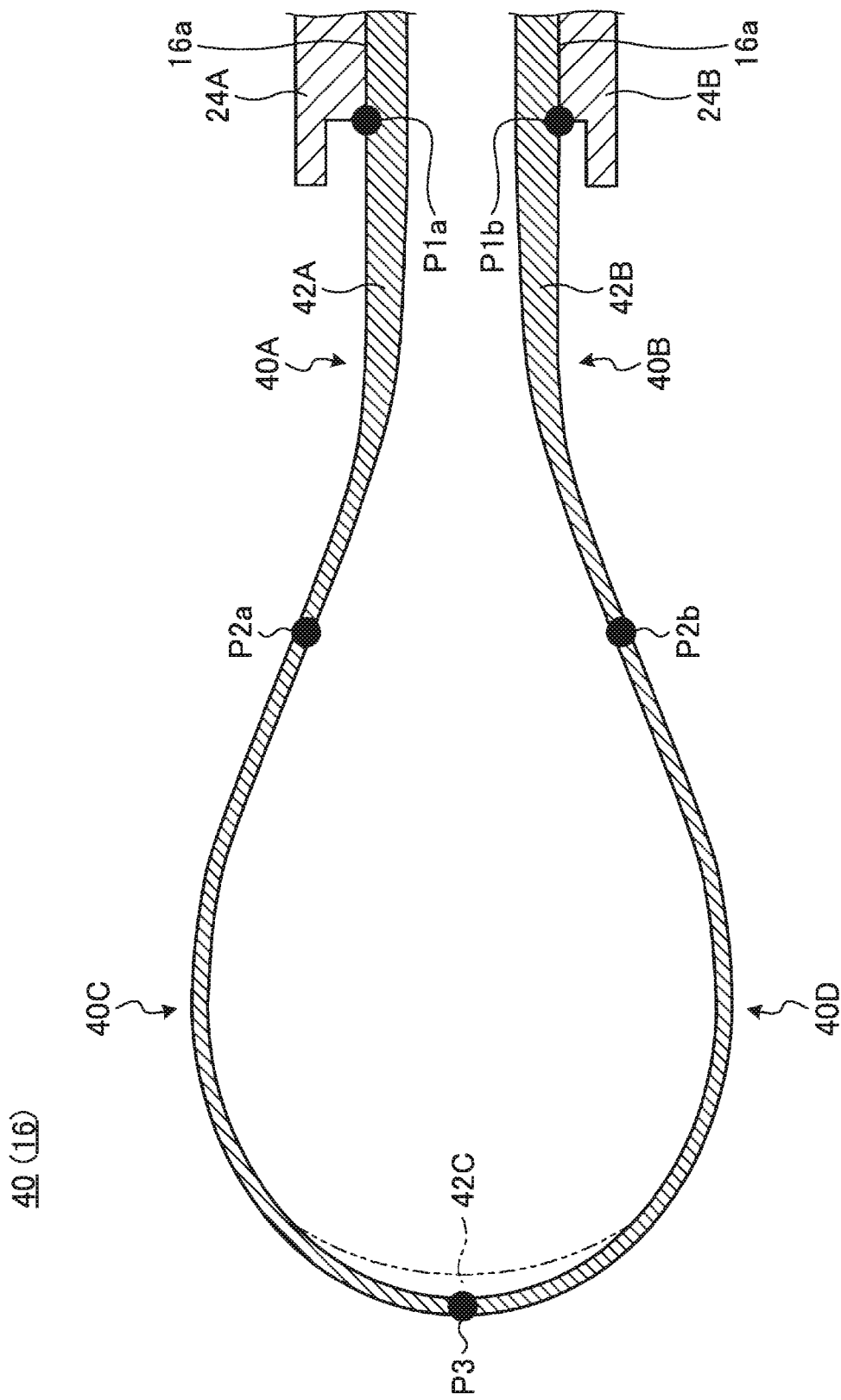
FIG. 8 is a side sectional view illustrating the structure of a sheet-shaped member according to a first modification.

FIG. 8 is a side sectional view illustrating the structure of a sheet-shaped member 40 according to a first modification. FIG. 8 illustrates a state of the sheet-shaped member 40 in the folded form, which omits the display 20, the hinge mechanism 18, the chassis 12A, 12B, and the like from the illustration. The same applies to FIG. 9.

As illustrated in FIG. 8, the sheet-shaped member 40 has a structure without the holes 34 like in the sheet-shaped member 22. The sheet-shaped member 40 is, for example, formed of a resin having high flexibility such as polyimide resin. The sheet-shaped member 40 has a first strength changing section 40A that takes the place of the first strength changing section 22A of the sheet-shaped member 22, and a second strength changing section 40B that takes the place of the second strength changing section 22B of the sheet-shaped member 22.

The first strength changing section 40A is formed into a tapered shape 42A that reduces the thickness of the sheet-shaped member 40 gradually from the first fixed point P1a toward the first inflection point P2a. Thus, like the first strength changing section 22A, the first strength changing section 40A reduces the flexural strength of the sheet-shaped member 40 gradually from the first fixed point P1a toward the first inflection point P2a. Similarly, the second strength changing section 40B is formed into a tapered shape 42B that reduces the thickness of the sheet-shaped member 40 gradually from the second fixed point P1b toward the second inflection point P2b. Thus, the second strength changing section 40B also reduces the flexural strength of the sheet-shaped member 40 gradually from the second fixed point P1b toward the second inflection point P2b.

The sheet-shaped member 40 may also have a third strength changing section 40C and a fourth strength changing section 40D similar to the third strength changing section 22C and the fourth strength changing section 22D of the sheet-shaped member 22 mentioned above. Each of these strength changing sections 40C and 40D may be formed into a tapered shape 42C (see a long dashed double-dotted line in FIG. 8) that increases the thickness of the sheet-shaped member 40 gradually from the inflection point P2a, P2b to the center P3, respectively.

Figure 9:
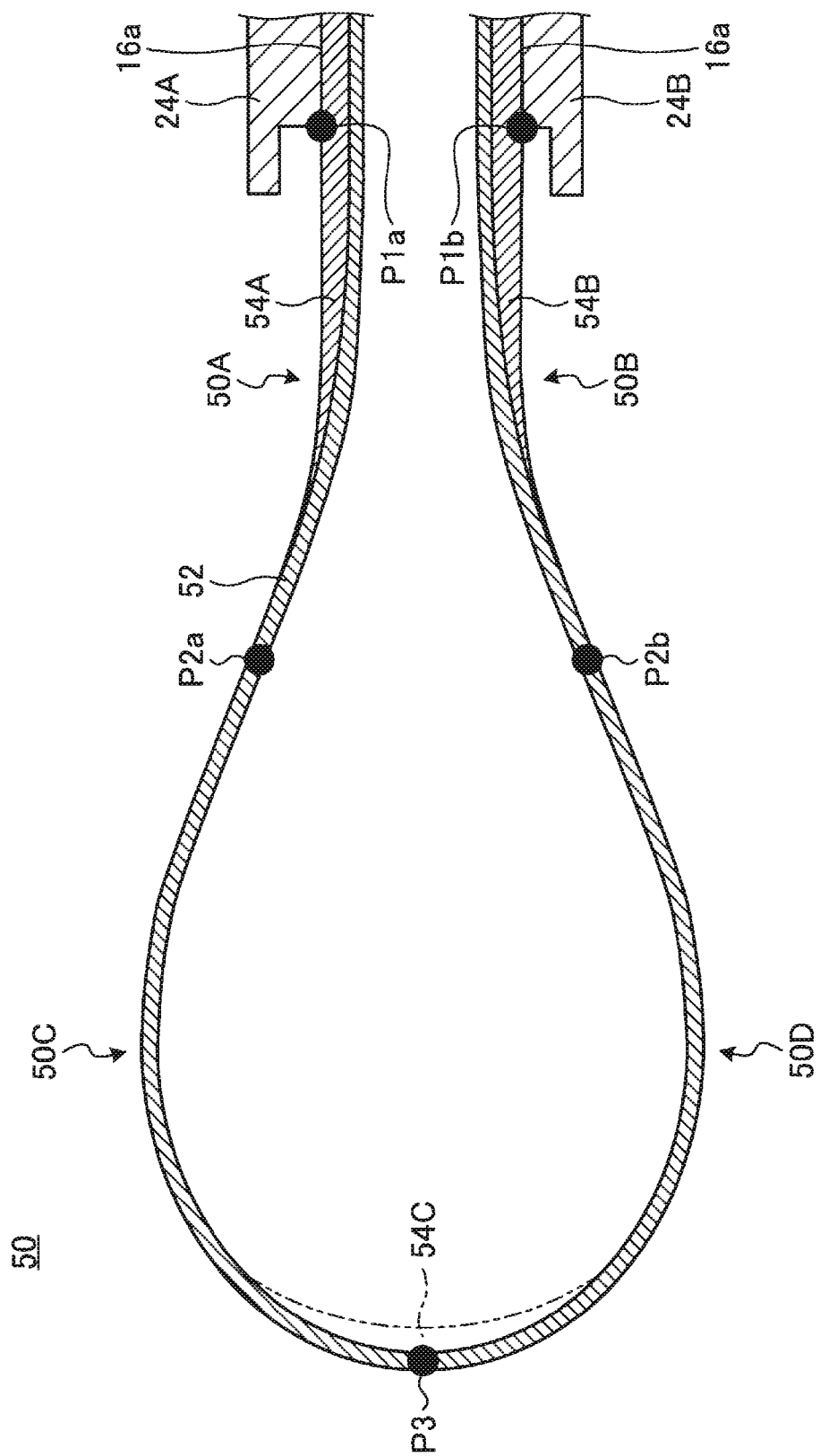
FIG. 9 is a side sectional view illustrating the structure of a sheet-shaped member according to a second modification.

FIG. 9 is a side sectional view illustrating the structure of a sheet-shaped member 50 according to a second modification.

As illustrated in FIG. 9, the sheet-shaped member 50 has a first strength changing section 50A that takes the place of the first strength changing section 22A of the sheet-shaped member 22, and a second strength changing section 50B that takes the place of the second strength changing section 22B of the sheet-shaped member 22. The sheet-shaped member 50 is so formed that a first auxiliary sheet 54A and a second auxiliary sheet 54B are pasted over the outer surface of a metal or resin base sheet 52 formed with uniform thickness to form the strength changing sections 50A and 50B, respectively. Each of the auxiliary sheets 54A and 54B is made, for example, of a fiber-reinforced plastic material obtained by impregnating a matrix resin with reinforcing fiber such as carbon fiber or glass fiber.

The first auxiliary sheet 54A is pasted between the first fixed point P1a and the first inflection point P2a of the base sheet 52. The first auxiliary sheet 54A has a tapered shape that reduces the thickness thereof gradually from the first fixed point P1a toward the first inflection point P2a. Thus, like the first strength changing section 22A mentioned above, the first strength changing section 50A reduces the flexural strength of the sheet-shaped member 50 gradually from the first fixed point P1a toward the first inflection point P2a. Similarly, the second auxiliary sheet 54B is pasted between the second fixed point P1b and the second inflection point P2b of the base sheet 52. The second auxiliary sheet 54B has a tapered shape that reduces the thickness thereof gradually from the second fixed point P1b toward the second inflection point P2b. Thus, the second strength changing section 50B also reduces the flexural strength of the sheet-shaped member 50 gradually from the second fixed point P1b toward the second inflection point P2b.

The sheet-shaped member 50 may also include a third strength changing section 50C and a fourth strength changing section 50D similar to the third strength changing section 22C and the fourth strength changing section 22D of the sheet-shaped member 22 mentioned above. Each of these strength changing section 50C and 50D may be so formed that a third auxiliary sheet 54C that increases the thickness thereof from the inflection point P2a, P2b toward the center P3 is pasted on the inner surface of the base sheet 52, respectively (see a long dashed double-dotted line in FIG. 9).

As described above, the portable information device 10 of the embodiment includes the display assembly 16 including the display 20 having the folding region R1 and the sheet-shaped member 22 (40, 50) having flexibility and fixed to cover the back surface 20a of the display 20. The sheet-shaped member 22 (40, 50) is fixed relative to the first chassis 12A at the first fixed point P1a and fixed relative to the second chassis 12B at the second fixed point P1b. Further, the folding region R1 is in a state of being movable relative to the chassis 12A and 12B. Thus, the first inflection point P2a at which the bending direction is reversed from the fixed point P1a toward the center P3 and the second inflection point P2b at which the bending direction is reversed from the second fixed point P1b toward the center P3 when the chassis 12A and 12B are shaped into the folded form are formed in the sheet-shaped member 22 (40, 50). Then, the sheet-shaped member 22 (40, 50) has the first strength changing section 22A (40A, 50A) in which the flexural strength decreases gradually from the first fixed point P1a toward the first inflection point P2a, and the second strength changing section 22B (40B, 50B) in which the flexural strength decreases gradually from the second fixed point P1b toward the second inflection point P2b.

Therefore, when the display assembly 16 is folded, the portable information device 10 can prevent the curvature radius of the bent part formed at the fixed points P1a, P1b corresponding to the root of the substantially bell shape and in the neighborhood thereof from getting smaller. As a result, in the portable information device 10, the occurrence of such a failure as to make the sheet-shaped member 22 (40, 50) peel off from the display 20 during folding operation can be prevented.

Note that the present invention is not limited to the aforementioned embodiment, and changes can be made freely without departing from the scope of the present invention.

In the above, the portable information device 10 foldable in half like a book is exemplified. However, in addition to the structure in which the same shaped chassis are folded in half, the present invention can also be applied to various structures, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which small-sized chassis are coupled to one of the right and left edges of a large-sized chassis in a foldable manner, and the number of coupled chassis may be four or more.

As has been described, the present invention provides a portable information device and a display assembly capable of preventing display failures due to folding operations.

While the invention has been particularly shown and described with reference to a preferred embodiment, it will be understood by those skilled in the art that various changes in form and detail may be made therein without departing from the spirit and scope of the invention.

What is claimed is:

1. A portable information device comprising:
   a first chassis includes a first plate;
   a second chassis rotatably coupled to said first chassis, wherein said second chassis includes a second plate;
   a display, covering said first and second chassis, includes a folding region located between said first and second chassis; and
   a flexible sheet-shaped member, covering a back surface of said display, is attached to said first plate at a first fixed point located at a position offset from a center of said folding region to a side of said first chassis, and is attached to said second plate at a second fixed point located at a position offset from said center of said folding region to a side of said second chassis, wherein said sheet-shaped member includes:
   a plurality of holes, and said flexural strength of said sheet-shaped member gradually decreases by gradually increasing an aperture ratio of said holes in said sheet-shaped member;
   a first strength changing section in which a flexural strength decreases gradually from said first fixed point towards a first inflection point; and
   a second strength changing section in which said flexural strength decreases gradually from said second fixed point towards a second inflection point.

2. The portable information device of claim 1, wherein said folding region is movable relative to said first and second chassis.

3. The portable information device of claim 1, wherein said first inflection point is where a bending direction is reversed from said first fixed point towards said center of said folding region, and said second inflection point is where said bending direction is reversed from said second fixed point towards said center of said folding region.

4. The portable information device of claim 1, wherein said sheet-shaped member further includes
   a third strength changing section in which said flexural strength of said sheet-shaped member decreases gradually from said center of said folding region towards said first inflection point; and
   a fourth strength changing section in which said flexural strength of said sheet-shaped member decreases gradually from said center of said folding region towards said second inflection point.

5. The portable information device of claim 1, wherein said flexural strength of said sheet-shaped member gradually decreases by gradually reducing a thickness of said sheet-shaped member.

6. The portable information device of claim 1, wherein said flexural strength of said sheet-shaped member gradually decreases by fixing, to said sheet-shaped member, an auxiliary sheet whose thickness gradually decreases.

7. The portable information device of claim 1, wherein a conductive sheet is provided on a surface or a back surface of said sheet-shaped member.

8. The portable information device of claim 1, wherein when said portable information device is in a folded form, said first and second chassis are disposed to overlap each other, and a region of said display on the side of said first chassis and a region of said display on the side of said second chassis are disposed to face each other.

9. A display assembly comprising:
- a display having a folding region in a position located between a first edge and a second edge; and
- a flexible sheet-shaped member covering a back surface of said display, wherein said sheet-shaped member, attached to a first plate of a first chassis, and to a second plate of a second chassis, includes
  - a plurality of holes, and said flexural strength of said sheet-shaped member gradually decreases by gradually increasing an aperture ratio of said holes in said sheet-shaped member;
  - a first strength changing section provided in a first position located between said first edge and said folding region in order to reduce a flexural strength gradually from said first edge towards said first position; and
  - a second strength changing section provided in a second position located between said second edge and said folding region in order to reduce said flexural strength gradually from said second edge towards said second position.

10. The display assembly of claim 9, wherein said sheet-shaped member further includes
- a third strength changing section in which said flexural strength of said sheet-shaped member decreases gradually from a center of said folding region towards said first position; and
- a fourth strength changing section in which said flexural strength of said sheet-shaped member decreases gradually from said center of said folding region towards said second position.

11. The display assembly of claim 9, wherein said flexural strength of said sheet-shaped member gradually decreases by gradually reducing a thickness of said sheet-shaped member.

12. The display assembly of claim 9, wherein said flexural strength of said sheet-shaped member gradually decreases by fixing, to said sheet-shaped member, an auxiliary sheet whose thickness gradually decreases.

13. The display assembly claim 9, wherein a conductive sheet is provided on one of two surfaces of said sheet-shaped member.

* * * * *